US010552772B2

(12) United States Patent
Weinstein et al.

(10) Patent No.: US 10,552,772 B2
(45) Date of Patent: Feb. 4, 2020

(54) BREAK MANAGEMENT SYSTEM

(71) Applicant: Intel Corporation, Santa Clara, CA (US)

(72) Inventors: Daniel P. Weinstein, Chandler, AZ (US); Jean A. Gullickson, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 506 days.

(21) Appl. No.: 15/282,439

(22) Filed: Sep. 30, 2016

(65) Prior Publication Data
US 2018/0095429 A1 Apr. 5, 2018

(51) Int. Cl.
G04F 3/06 (2006.01)
G06Q 10/10 (2012.01)
G06Q 10/06 (2012.01)

(52) U.S. Cl.
CPC ..... *G06Q 10/06311* (2013.01); *G06Q 10/109* (2013.01)

(58) Field of Classification Search
CPC ......... G06F 17/30; G06Q 10/00–99/00; G04F 1/00–13/00
See application file for complete search history.

(56) References Cited

U.S. PATENT DOCUMENTS

| 5,305,238 | A | * | 4/1994 | Starr, III | G06F 3/021 400/704 |
| 2009/0177503 | A1 | * | 7/2009 | Kawano | G06Q 10/02 705/5 |
| 2014/0156645 | A1 | * | 6/2014 | Brust | G06F 3/0481 707/722 |

(Continued)

FOREIGN PATENT DOCUMENTS

EP 2550627 A1 * 1/2013 ........... G06Q 10/109

OTHER PUBLICATIONS

Al-Yakoob, Salem & Sherali, Hanif. (2007). Multiple Shift Scheduling of Hierarchical Workforce with Multiple Work Centers.. Informatica, Lith. Acad. Sci.. 18. 325-342. (Year: 2007).*

(Continued)

*Primary Examiner* — Alan S Miller
*Assistant Examiner* — Jay-Ming Wang
(74) *Attorney, Agent, or Firm* — Jordan IP Law, LLC

(57) ABSTRACT

An embodiment of a break management apparatus may include a manual-input integrator to integrate manual-input-related information for a user, a break timer communicatively coupled to the manual-input integrator to time a period of time since a prior break-related action of the user as a break-related action and to provide timer-related information, a contextual integrator to integrate contextual information for the user in addition to the manual-input-related information and the timer-related information, and a break recommender communicatively coupled to the break timer and the contextual integrator to recommend that the user take a recommended break-related action based on the period of time since the prior break-related action of the user and also based on the contextual information for the user. Other embodiments are disclosed and claimed.

21 Claims, 4 Drawing Sheets

(56) References Cited

U.S. PATENT DOCUMENTS

2014/0188541 A1* 7/2014 Goldsmith ............. G06Q 10/06
705/7.19
2015/0206443 A1* 7/2015 Aylesworth ............. G09B 5/00
434/322

OTHER PUBLICATIONS

Eric Parker, "Best apps for Apple's Health app and HealthKit", ismartliving.net/tips/best-apps-for-apples-health-app-and-healthkit/, May 7, 2015, 18 pages.
"The Google Fit SDK", developers.google.com/fit/, Aug. 30, 2016, 3 pages.
"What is WorkPace?", wellnomics.com/workpace/about/what-is-workpace/, Aug. 30, 2016, 2 pages.

* cited by examiner

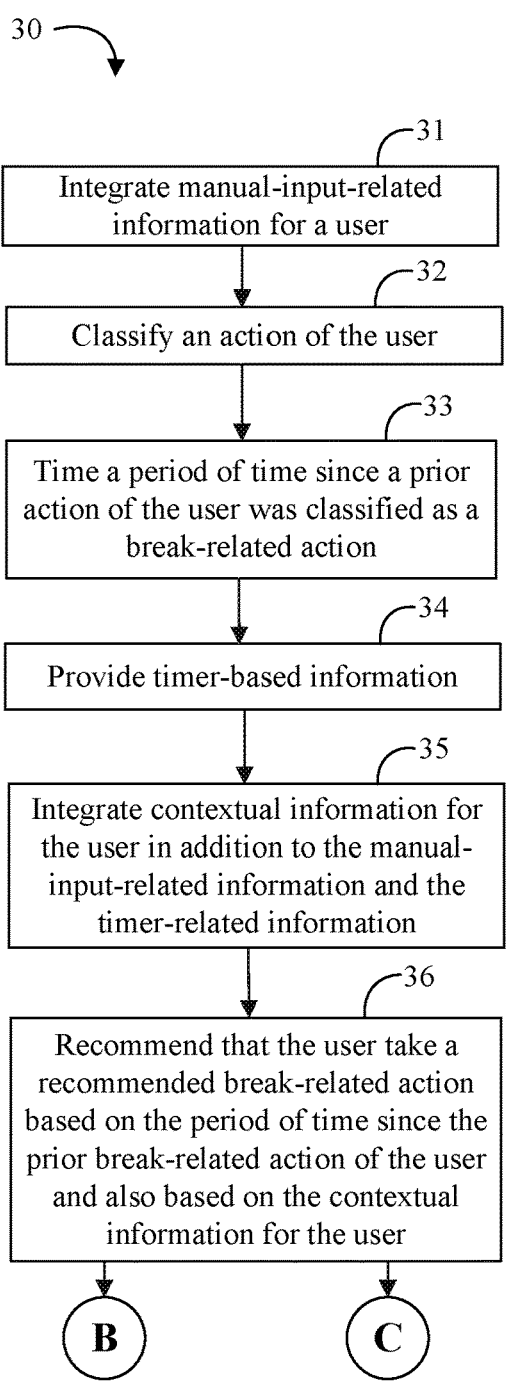
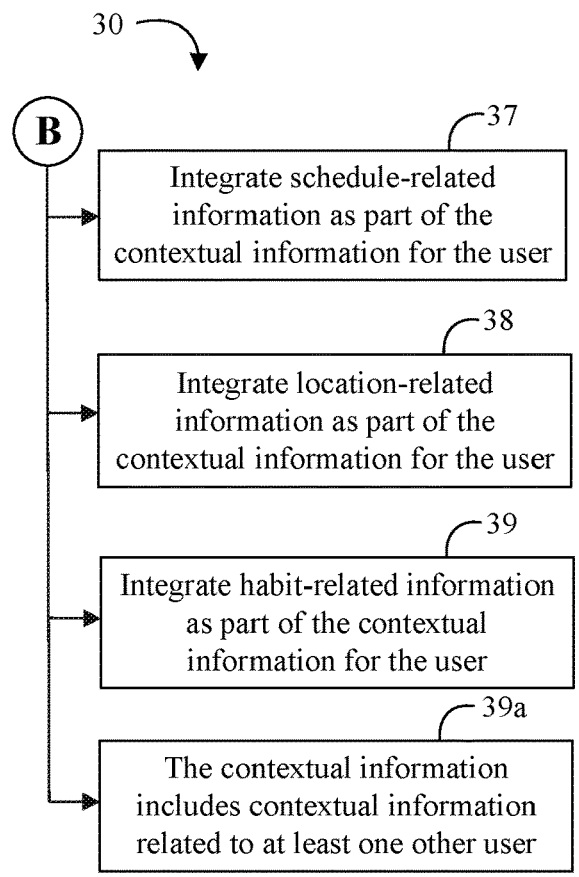
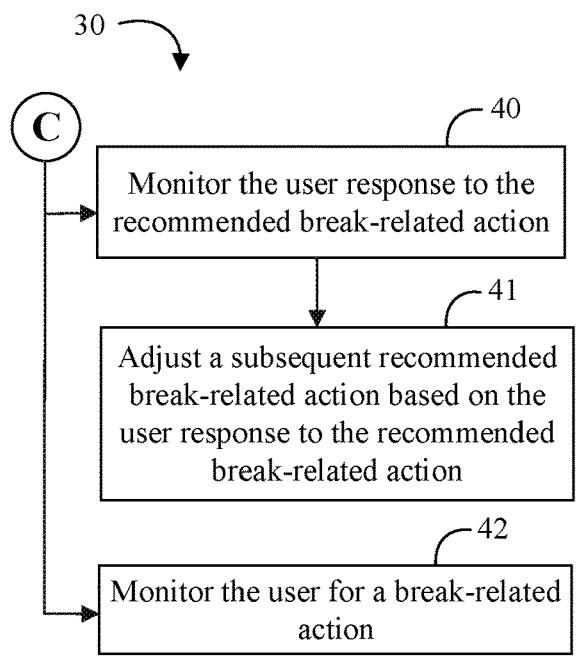
FIG. 3A
FIG. 3B
FIG. 3C

BREAK MANAGEMENT SYSTEM

TECHNICAL FIELD

Embodiments generally relate to ergonomics and activity pace management. More particularly, embodiments relate to a break management system.

BACKGROUND

Prolonged period of sedentary behavior may have a negative effect on a person's health. Likewise, prolonged periods of activity at a keyboard or in front of a screen may have a negative effect on a person's health. An activity monitor may utilize a timer to alert a person to a prolonged period of sedentary behavior. An activity monitor may count keystrokes over a period of time to alert a person to a prolonged period of keyboard activity.

BRIEF DESCRIPTION OF THE DRAWINGS

The various advantages of the embodiments will become apparent to one skilled in the art by reading the following specification and appended claims, and by referencing the following drawings, in which:

FIGS. 3A to 3C are flowcharts of an example of a method of managing a break according to an embodiment;

DESCRIPTION OF EMBODIMENTS

Figure 1:
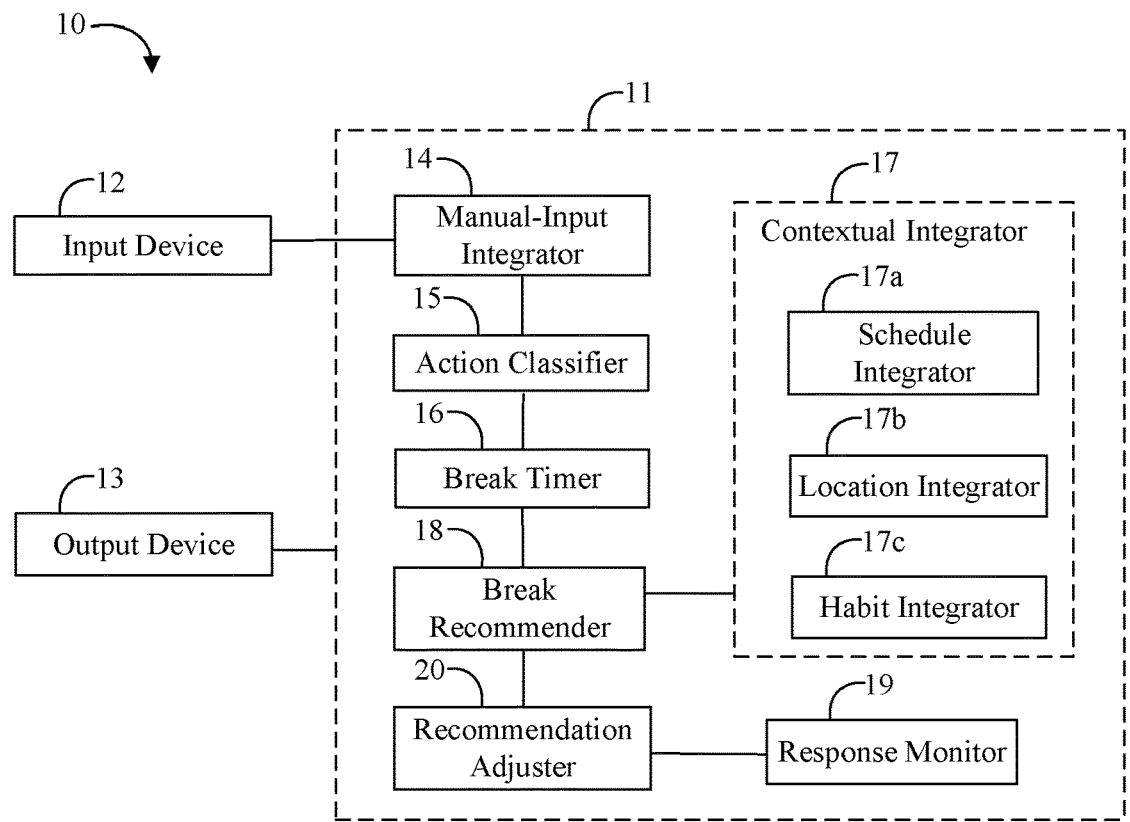
FIG. 1 is a block diagram of an example of a break management system according to an embodiment.

Turning now to FIG. 1, an embodiment of a break management system 10 may include a computing device 11, an input device 12 communicatively coupled to the computing device 11, and an output device 13 communicatively coupled to the computing device 11. The computing device 11 may further include a manual-input integrator 14 communicatively coupled to the input device 12 to integrate manual-input-related information for a user, an action classifier 15 communicatively coupled to the manual-input integrator 14 to classify an action of the user, a break timer 16 communicatively coupled to the action classifier 15 to time a period of time since the action classifier classified a prior action of the user as a break-related action and to provide timer-related information, a contextual integrator 17 to integrate contextual information for the user in addition to the manual-input-related information and the timer-related information, and a break recommender 18 communicatively coupled to the break timer 16 and the contextual integrator 17 to recommend that the user take a recommended break-related action based on the period of time since the action classifier 15 classified the prior action of the user as the break-related action and also based on the contextual information. For example, the contextual information may include contextual information related to at least one other user (e.g. another user's calendar information, notifications from a health buddy, etc.).

In some embodiments of the break management system 10, the contextual integrator 17 may include a schedule integrator 17a to integrate schedule-related information for the user. For example, the break recommender 18 may be further configured to recommend that the user take the recommended break-related action based on the schedule-related information. For example, schedule-related information may include calendar information, reminder information, and/or alarm information (e.g. from corresponding applications on the user's computer, apps on the user's smartphone or wearable devices, and/or the user's cloud services).

The contextual integrator 17 may also include a location integrator 17b to integrate location-related information for the user, where the break recommender 18 may be further configured to recommend that the user take the recommended break-related action based on the location-related information. The contextual integrator 17 may further include a habit integrator 17c to integrate habit-related information for the user, where the break recommender 18 may be further configured to recommend that the user take the recommended break-related action based also on the habit-related information.

In some embodiments of the break management system 10, the computing device 11 may further include a response monitor 19 to monitor the user response to the recommended break-related action, and a recommendation adjuster 20 communicatively coupled to the response monitor 19 and the break recommender 18 to adjust a subsequent recommended break-related action based also on the user response to the recommended break-related action.

Embodiments of each of the above computing device 11, manual-input integrator 14, action classifier 15, break timer 16, contextual integrator 17 (e.g. including the schedule integrator 17a, location integrator 17b, and habit integrator 17c), break recommender 18, response monitor 19, recommendation adjuster 20, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively, or additionally, these components may be implemented in one or more modules as a set of logic instructions stored in a machine-or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C# or the like and conventional procedural programming languages, such as the "C" programming language or similar programming languages.

Figure 2:
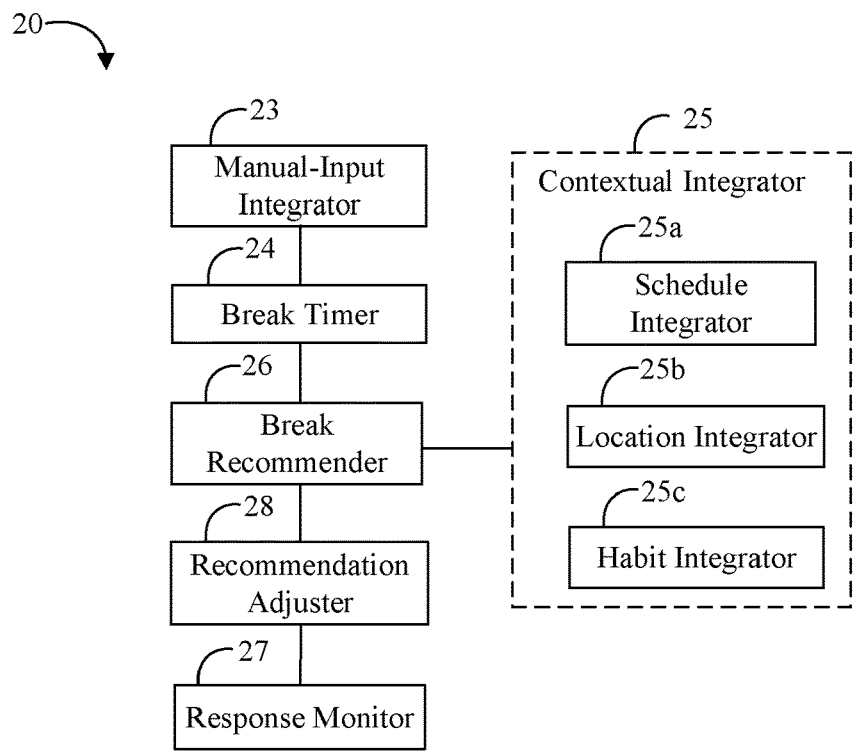
FIG. 2 is a block diagram of an example of a break management apparatus according to an embodiment.

Turning now to FIG. 2, an embodiment of a break management apparatus 22 may include a manual-input integrator 23 to integrate manual-input-related information for a user, a break timer 24 communicatively coupled to the manual-input integrator 23 to time a period of time since a prior break-related action of the user as a break-related action and to provide timer-related information, a contextual integrator 25 to integrate contextual information for the user in addition to the manual-input-related information and the timer-related information, and a break recommender 26 communicatively coupled to the break timer 24 and the contextual integrator 25 to recommend that the user take a recommended break-related action based on the period of time since the prior break-related action of the user and also based on the contextual information for the user. For example, the contextual integrator 25 may include a schedule integrator 25a to integrate schedule-related information as part of the contextual information for the user, a location integrator 25b to integrate location-related information as part of the contextual information for the user, and/or a habit integrator 25c to integrate habit-related information as part of the contextual information for the user. Some embodiments of the break management apparatus 22 may further include a response monitor 27 to monitor the user response to the recommended break-related action, and a recommendation adjuster 28 communicatively coupled to the response monitor 27 and the break recommender 26 to adjust a subsequent recommended break-related action based on the user response to the recommended break-related action. For example, the contextual information may include contextual information related to at least one other user (e.g. another user's calendar information, notifications from a health buddy, etc.).

In accordance with some embodiments, an integrator may develop or store information on its own. In addition, or alternatively, an integrator may link to an application, server, or service to integrate the information. For example, the schedule integrator 25a may maintain its own schedule information for the user to integrate the user's schedule-related information. Alternatively, or in addition, the schedule integrator 25a may link to other applications or services (e.g. a calendar application or a calendar cloud service) that contain the user's schedule-related information.

Embodiments of each of the above manual-input integrator 23, break timer 24, contextual integrator 25 (e.g. including the schedule integrator 25a, location integrator 25b, and habit integrator 25c), break recommender 26, response monitor 27, recommendation adjuster 28, and other components of the break management apparatus 20 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, these components may be implemented in one or more modules as a set of logic instructions stored in a machine-or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C# or the like and conventional procedural programming languages, such as the "C" programming language or similar programming languages.

Turning now to FIGS. 3A-3C, an embodiment of a method 30 of managing a break may include integrating manual-input-related information for a user at block 31, classifying an action of the user at block 32, timing a period of time since a prior action of the user was classified as a break-related action at block 33, providing timer-based information at block 34, integrating contextual information for the user in addition to the manual-input-related information and the timer-related information at block 35, and recommending that the user take a recommended break-related action based on the period of time since the prior break-related action of the user and also based on the contextual information for the user at block 36. For example, the method 30 may further include integrating schedule-related information as part of the contextual information for the user at block 37, integrating location-related information as part of the contextual information for the user at block 38, and/or integrating habit-related information as part of the contextual information for the user at block 39. For example, the contextual information may include contextual information related to at least one other user (e.g. another user's calendar information, notifications from a health buddy, etc.) at block 39a.

Some embodiments of the method 30 of managing a break may further include monitoring the user response to the recommended break-related action at block 40, and adjusting a subsequent recommended break-related action based on the user response to the recommended break-related action at block 41. The method 30 may further include monitoring the user for a break-related action at block 42.

Embodiments of the method 30 may be implemented in a break management system or a break management apparatus such as, for example, those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine-or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++ or the like and conventional procedural programming languages, such as the "C" programming language or similar programming languages. For example, the method 30 may be implemented on a computer readable medium as described in connection with Examples 18 to 24 below.

Office or computer related injuries of strains, sprains, and/or cumulative stress disorders may be a problem for some people. Advantageously, some embodiments of a break management system and/or apparatus may intelligently offer coaching to an individual based on schedule integration, location positioning, and/or artificial intelligence or machine learning of individual habits (e.g. in addition to or alternative to detected computer usage or timer-based physical movement tracking).

A conventional wearable fitness device may only notice physical location movement combined with a timer. Therefore, a user may get a reminder to move or stand only based on a timer. Conventional ergonomics software such may count keystrokes or mouse clicks, and send reminders at set time windows as well. The results of conventional solutions are reminders that may occur at an inopportune time that are ignored (e.g. during the middle of a meeting, while sitting in a car driving, etc.). Conventional attempts at getting people moving, taking breaks, etc., may currently be viewed as annoyances and/or nuisance versus the thought provoking/ habit changing element they could be.

Compared with conventional solutions, such as software that counts keystrokes or a wearable fitness device that simply utilizes a timer for recommendations for a user to stand or take a break, some embodiments may advantageously integrate multiple factors to make recommendations that can be more readily followed by the user, resulting in a potentially healthier day for the user. Some embodiments may also reduce or minimize annoying disruptions that occur at an inopportune time. Advantageously, more intelligent and better timed recommendations are more likely to be positively responded to by the user and ultimately may reduce office or computer related injuries.

Some embodiments of a break management system or apparatus may leverage the integration of multiple different technologies. One technology may include utilizing machine vision to monitor a user's activity. Another technology may utilize machine learning elements (e.g. of a wearable for personal movement and ergonomic characterization, e.g. to learn a user's habits). Another technology may include schedule integration to understand scheduled events, such as meetings, appointments, reminders, alarms, and/or breaks between scheduled events. Another technology may include location integration to understand distances between events, breaks, and locations within buildings. Another technology may include applying intelligence (e.g. contextual intelligence, artificial intelligence, machine learning, etc.) across the technologies (e.g. movement, day planning, location, habits, etc.) to make smart recommendations to reduce or minimize sedentary states and/or overuse of mouse/keyboards/screen time.

Figure 4:
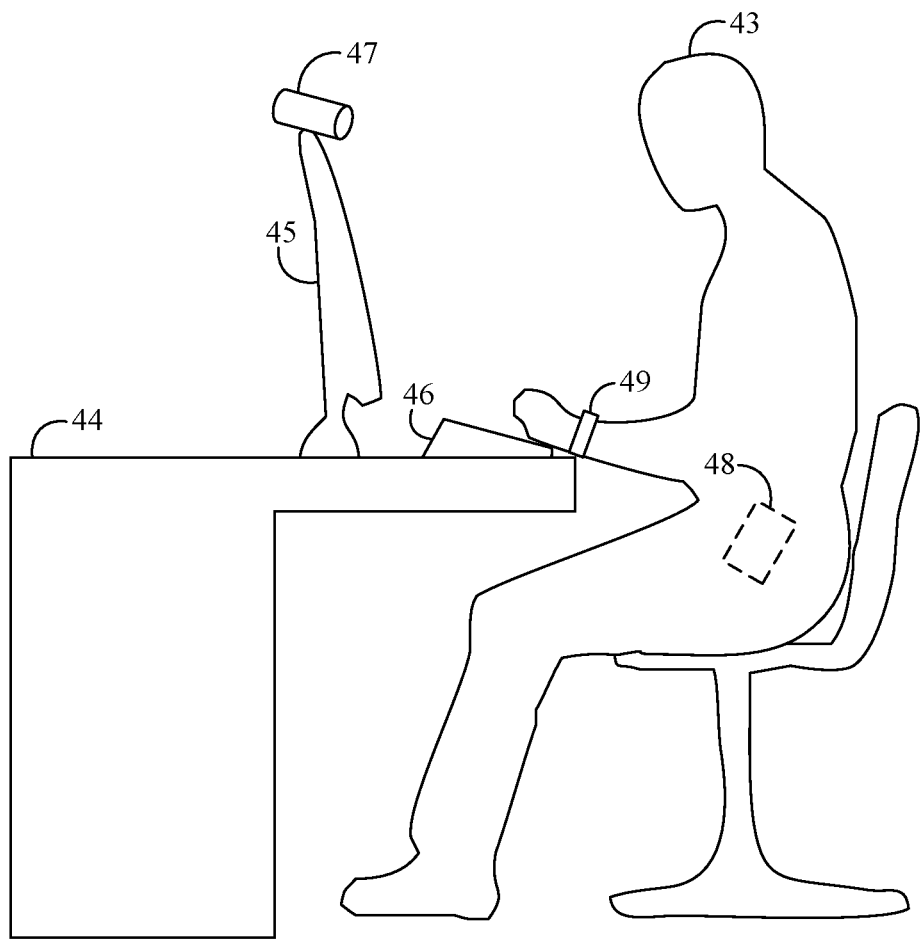
FIG. 4 is an illustration of an example of a user in a workspace according to an embodiment.

Turning now to FIG. 4, a user 43 may be sitting at a desk 44 working on a computer 45 in an example workspace. As illustrated, for example, the computer 45 may be an all-in-one computer. Other non-limiting examples for the computer 45 include a desktop, a laptop, a notebook, a tablet, a 2-in-1 computer, a convertible computer, and a gaming console. The user 43 may type on a keyboard 46 and/or utilize a mouse, trackpad, touchscreen, etc. to manually provide input to the computer 45. In accordance with some embodiments, the computer 45 may include and/or implement a break management system utilizing a sensor hub, machine vision, and/or machine learning to provide smart break recommendations to the user 43. For example, the computer 45 may include a two dimensional (2D), three dimensional (3D), and/or depth camera 47. The user 43 may carry a smartphone 48 (e.g. in the user's pocket) and/or may wear a wearable device 49 (e.g. such as a smart watch, an activity monitor, and/or a fitness tracker). The computer 45 may also include a microphone which may be utilized to detect if the user is speaking on the phone, speaking to another nearby person, etc. The sensor hub may include some or all of the user's various devices which are capable of capturing information related to the user's actions or activity (e.g. including an input/output (I/O) interface of the computer 45 which can capture keyboard/mouse/touch activity). The capture devices of the sensor hub may be directly coupled to the computer 45 (e.g. wired or wirelessly) or the computer 45 may be able to integrate information from the devices from a server or a service (e.g. a daily activity log may be uploaded from a fitness tracker to a cloud service, which the computer 45 may download).

Figure 5:
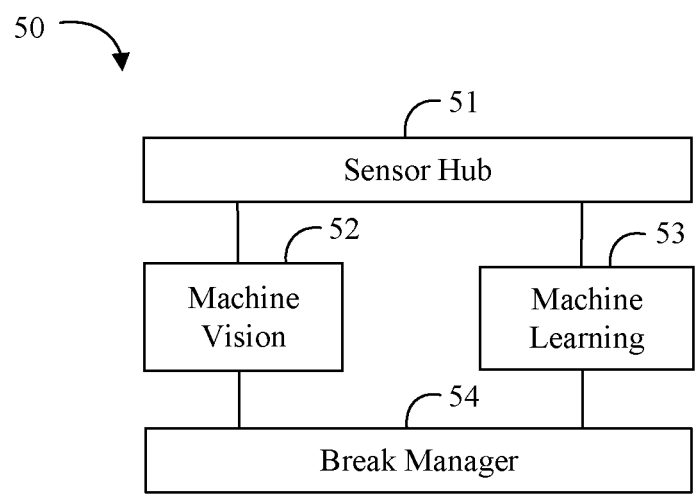
FIG. 5 is a block diagram of another example of a break management system according to an embodiment.

Turning now to FIG. 5, an embodiment of a break management system 50 may include a sensor hub 51, a machine vision system 52 communicatively coupled to the sensor hub 51, a machine learning system 53 communicatively coupled to the sensor hub 51, and a break manager 54 communicatively coupled to the machine vision system 52 and the machine learning system 53 to manage break-related recommendations to a user. For example, embodiments of the break management system 50 may be included and/or implemented on the computer 45 from FIG. 4. For example, the sensor hub 51 may include 2D cameras, 3D cameras, depth cameras, gyroscopes, accelerometers, inertial measurement unit (IMU), location services, microphones, proximity sensors, and/or some combination of multiple sources which provide information to the break management system 50 to determine where the user is/has been and whether the user is/was active during the day. The sensor hub 51 may be distributed across multiple devices. The information from the sensor hub 51 may include or be combined with keystroke logging and break timers.

Some embodiments of the machine vision system 52, for example, may analyze and/or perform feature/object recognition on images captured by the camera 47 from FIG. 4. For example, the machine vision system 52 may be configured to perform facial recognition, gaze tracking, facial expression recognition, and/or gesture recognition including body-level gestures, arm/leg-level gestures, hand-level gestures, and/or finger-level gestures. The machine vision system 52 may be configured to classify an action of the user. In some embodiments, a suitably configured machine vision system 52 may be able to determine if the user is present at the computer, typing at the keyboard, using the mouse, using the trackpad, using the touchscreen, sitting, standing, stretching, and/or other taking some other action or activity. The break manager 54 may be able to use the determinations of the machine vision system 52 to make smarter break recommendations. For example, if the user is already standing the break manager 54 may adjust the break-related recommendation to stretch instead of stand. The machine vision system 52 may also monitor the user's action following the recommendation to determine if the user stretched in response to the recommendation. If the user didn't follow the recommendation, the break manager 54 may make a different recommendation in a similar situation in the future. Other devices from the sensor hub may additionally or alternatively be used to monitor the user. For example, a smartphone may include a gyroscope/accelerometer log which can be analyzed to determine if the user is sitting, standing, moving, etc.

The machine learning system 53 may learn the patterns of the individual and the break manager 54 may make recommendations based on the suggested habits that are being followed (e.g. based on monitoring the response of the user) or adjust recommendations for those that are being ignored. Some embodiments of the machine learning system 53, for example, may receive information from various sources to learn the user's habits, preferences, and other information which may be useful in making smarter break-related recommendations. For example, the user may talk a walk at about the same time every day (or every Tuesday, etc.). The walk activity may be captured by a health app on the user's smartphone or by the user's fitness tracker. The machine learning system 53 may receive information related to the walk activity (e.g. time, duration, number of steps, etc.) and may learn from that information that the walk activity appears to be a habit of the user.

Some embodiments of the machine learning system 53 may learn the user's meeting habits. For example, a calendar entry may have both room and phone, but the machine learning system 53 may learn a pattern where that user generally calls in or walks to particular meetings. Advantageously, some embodiments of the break manager 54 may include pro-active notification aspect. For example, the break manager 54 may get the information from the machine learning system 53 that you called into a regularly scheduled meeting in past. The break manager 54 may provide coaching to suggest that the user walk instead (e.g. based on a recognition of the number of steps, the location of conference rooms, etc.).

In some embodiments, the contextual information may include contextual information related to at least one other user. For example, teaming with another person may be an effective way to improve health-related habits. With appropriate user permissions, some embodiments of a break management system may use information or data to give feedback to the user and/or third parties (individuals, employers, insurance companies, doctor, etc.). For example, the third party individual may be a selected/designated health buddy to get the user up and moving. With appropriate user permissions, the break manager 54 may encourage the user to take a walk with someone that system 50 recognizes the user is often with (e.g. the health buddy or someone who has the same meeting scheduled).

Even though not a scheduled activity, such habit-related information may be useful for the break manager 54 to make smarter break recommendations. For example, if the user has had a prolonged period of sedentary behavior, a break timer may reach its limit and indicate the need for a break alert. The break manager 54 may determine that the timing of the alert is just before the user's daily walk activity habit and restart the break timer or adjust the break timer to expire again 5 minutes after the expected unscheduled walk. If the user takes the walk, this break related action will restart a new break timer period. If for some reason the user does not take their habitual walk and instead continues the sedentary behavior, the adjusted break timer may expire after 5 minutes and the break manager 54 may then make a break-related recommendation. Advantageously, the user may not be interrupted or annoyed by an unnecessary break reminder just before their daily walk.

Some embodiments of the machine learning system 53 may also learn location-related information. For example, the machine learning system 53 may integrate a map of the user's workplace to understand how far it may be between the user's current location and a location of a scheduled event (e.g. a meeting room). The machine learning system 53 may estimate the number of steps the user may take for a particular distance. The machine learning system 53 may also be individualized to learn the actual number of steps the particular user took to go to a particular location and use that learning to improve future estimates. Even without a map or location service (e.g. a global satellite position (GPS) service), the machine learning system 53 may keep track of locations (e.g. a meeting room noted in a calendar event) and the number of steps the user took to get to that location (e.g. as reported by a fitness tracker) to learn useful information for the break manager 54 to make smarter break-related actions.

For example, if a meeting is calendared with a phone number but no room and no physical location change, it is most likely a meeting held by a phone conversation that involves sitting for the length of that meeting and a recommendation to stand can be effective and accomplished easily. If a meeting has an associated room location, the machine learning system 53 can predict the steps for that effort. Once the timer/count limit is reached, the break manager 54 can look ahead for a physical gap in the individual's calendar for a recommended action during the gap. For example, the break manager 54 may provide a gentle reminder to be creative between meetings to achieve some level of movement (e.g. walk, don't call into the next meeting). Advantageously, some embodiments of a break management system may make a more in depth analysis (e.g. calendar) such that a break-related reminder may come when the user can actually take a break (e.g. not in the middle of meeting you don't want to stop or stand up or stretch) or may adjust the recommendation based on the context (e.g. to do an ankle flex in the middle of a meeting instead of standing or stretching). Advantageously, the user may be less likely to ignore a smarter, context-based reminder.

Embodiments of each of the above sensor hub 51, machine vision system 52, machine learning system 53, break manager 54, and other components of the break management system 50 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, these components may be implemented in one or more modules as a set of logic instructions stored in a machine-or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C# or the like and conventional procedural programming languages, such as the "C" programming language or similar programming languages.

Figure 6:
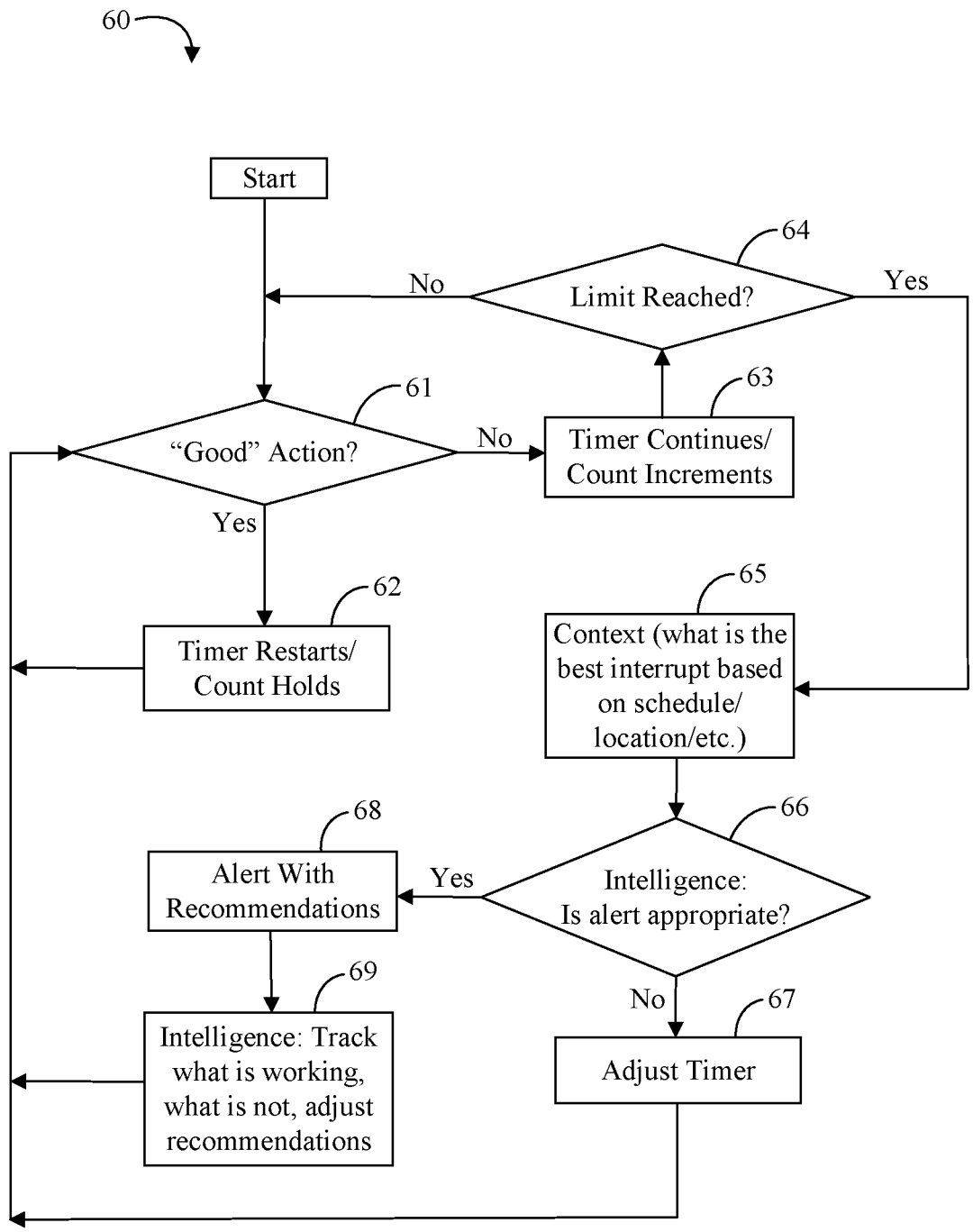
FIG. 6 is a flowchart of an example of a method of managing a break according to an embodiment.

Turning now to FIG. 6, an embodiment of a method 60 of managing a break may include determining if a user is performing or has performed a "good" action (e.g. a break-related or healthy action) at block 61. If the user is determined to have performed a "good" action, a timer may be restarted and/or a count may be restarted or held at block 62. If the user is determined to not have performed a "good" action, the timer continues and/or the count may be incremented at block 63. For example, a "good" action may correspond to taking a break from active work with additional movement such as walking, stretching, etc. If not "good" from a health perspective, the user's action (or lack thereof) may correspond to sedentary activity, continuous typing or mouse movement. For example, a fitness tracker may monitor movement of an internal gyroscope and determine if the user is moving based on its internal logic and sensitivities (e.g. "good" actions) and start an internal timing if they are not (e.g. not "good" actions).

If the timer/count limit is not reached at block 64, the method 60 continues to monitor the actions of the user at block 61. Once that limit is reached at block 64, the context is integrated at block 65 to determine, for example, how an activity alert will fit with the individual's schedule and physical location (e.g. determined through GPS, wireless hub identifier, or other location service) and to develop an understanding of what is driving the individual's current and near term actions. Intelligence is applied at block 66 to assess if and when the alert is appropriate (e.g. based on the current calendar item or location). If the alert is determined to not be appropriate (e.g. based on looking ahead at the individual's calendar), the timer/count may be restarted or adjusted (e.g. pushed out 5 minutes) at block 67 and the method 60 may continue to monitor the user's actions at block 61.

If the alert is determined to be appropriate, an alert with a recommend action may be given at block 68 (e.g. a fitness tracker will vibrate or send a text alert to the user that they should move). For example, a reminder may be given by a computing device and displayed on a screen. After the alert is given, intelligence may be applied at block 69 to track what is working, what is not, and to adjust future recommendations. The method 60 may then continue to monitor the user's actions at block 61. Some embodiments of the method 60 may provide a closed loop and more intelligent break recommendations based on good actions. In some embodiments of the method 60, even if there are no contextual adjustments, the timers may still operate for general boundary conditions.

Embodiments of the method 60 may be implemented in a break management system or a break management apparatus such as, for example, those described herein. More particularly, hardware implementations of the method 60 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 60 may be implemented in one or more modules as a set of logic instructions stored in a machine-or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++ or the like and conventional procedural programming languages, such as the "C" programming language or similar programming languages.

Some embodiments of a break management system may aggregate information or data to track population wide health/activity level (e.g. company-wide). Advantageously, some embodiments may further a corporate health/safety culture with personalized feedback to enable the employees to learn positive workplace habits which may get employees more engaged and active at work, while at the same time reducing healthcare costs with less office cumulative stress related disorders.

Additional Notes and Examples

Example 1 may include a break management system, comprising a computing device, an input device communicatively coupled to the computing device, and an output device communicatively coupled to the computing device, the computing device further including a manual-input integrator communicatively coupled to the input device to integrate manual-input-related information for a user, an action classifier communicatively coupled to the manual-input integrator to classify an action of the user, a break timer communicatively coupled to the action classifier to time a period of time since the action classifier classified a prior action of the user as a break-related action and to provide timer-related information, a contextual integrator to integrate contextual information for the user in addition to the manual-input-related information and the timer-related information, and a break recommender communicatively coupled to the break timer and the contextual integrator to recommend that the user take a recommended break-related action based on the period of time since the action classifier classified the prior action of the user as the break-related action and also based on the contextual information.

Example 2 may include the break management system of Example 1, wherein the contextual integrator comprises a schedule integrator to integrate schedule-related information for the user, wherein the break recommender is further to recommend that the user take the recommended break-related action based on the schedule-related information.

Example 3 may include the break management system of any of Examples 1 to 2, wherein the contextual integrator comprises a location integrator to integrate location-related information for the user, wherein the break recommender is further to recommend that the user take the recommended break-related action based on the location-related information.

Example 4 may include the break management system of any of Examples 1 to 3, wherein the contextual integrator comprises a habit integrator to integrate habit-related information for the user, wherein the break recommender is further to recommend that the user take the recommended break-related action based also on the habit-related information.

Example 5 may include the break management system of any of Examples 1 to 6, wherein the computing device further comprises a response monitor to monitor the user response to the recommended break-related action, and a recommendation adjuster communicatively coupled to the response monitor and the break recommender to adjust a subsequent recommended break-related action based also on the user response to the recommended break-related action.

Example 6 may include a break management apparatus, comprising a manual-input integrator to integrate manual-input-related information for a user, a break timer communicatively coupled to the manual-input integrator to time a period of time since a prior break-related action of the user as a break-related action and to provide timer-related information, a contextual integrator to integrate contextual information for the user in addition to the manual-input-related information and the timer-related information, and a break recommender communicatively coupled to the break timer and the contextual integrator to recommend that the user take a recommended break-related action based on the period of time since the prior break-related action of the user and also based on the contextual information for the user.

Example 7 may include the break management apparatus of Example 6, wherein the contextual integrator includes a schedule integrator to integrate schedule-related information as part of the contextual information for the user.

Example 8 may include the break management apparatus of any of Examples 6 to 7, wherein the contextual integrator includes a location integrator to integrate location-related information as part of the contextual information for the user.

Example 9 may include the break management apparatus of any of Examples 6 to 8, wherein the contextual integrator includes a habit integrator to integrate habit-related information as part of the contextual information for the user.

Example 10 may include the break management apparatus of any of Examples 6 to 9, further comprising a response monitor to monitor the user response to the recommended break-related action, and a recommendation adjuster communicatively coupled to the response monitor and the break recommender to adjust a subsequent recommended break-related action based on the user response to the recommended break-related action.

Example 11 may include a method of managing a break, comprising integrating manual-input-related information for a user, classifying an action of the user, timing a period of time since a prior action of the user was classified as a break-related action, providing timer-based information, integrating contextual information for the user in addition to the manual-input-related information and the timer-related information, and recommending that the user take a recommended break-related action based on the period of time since the prior break-related action of the user and also based on the contextual information for the user.

Example 12 may include the method of managing a break of Example 11, further comprising integrating schedule-related information as part of the contextual information for the user.

Example 13 may include the method of managing a break of any of Examples 11 to 12, further comprising integrating location-related information as part of the contextual information for the user.

Example 14 may include the method of managing a break of any of Examples 11 to 13, further comprising integrating habit-related information as part of the contextual information for the user.

Example 15 may include the method of managing a break of any of Examples 11 to 14, further comprising monitoring the user response to the recommended break-related action.

Example 16 may include the method of managing a break of Example 15, further comprising: adjusting a subsequent recommended break-related action based on the user response to the recommended break-related action.

Example 17 may include the method of managing a break of any of Examples 11 to 16, further comprising monitoring the user for a break-related action.

Example 18 may include at least one computer readable medium, comprising a set of instructions, which when executed by a computing device, cause the computing device to integrate manual-input-related information for a user, classify an action of the user, time a period of time since a prior action of the user was classified as a break-related action, provide timer-based information, integrate contextual information for the user in addition to the manual-input-related information and the timer-related information, and recommend that the user take a recommended break-related action based on the period of time since the prior break-related action of the user and also based on the contextual information for the user.

Example 19 may include the at least one computer readable medium of Example 18, comprising a further set of instructions, which when executed by a computing device, cause the computing device to integrate schedule-related information as part of the contextual information for the user.

Example 20 may include the at least one computer readable medium of any of Examples 18 to 19, comprising a further set of instructions, which when executed by a computing device, cause the computing device to integrate location-related information as part of the contextual information for the user.

Example 21 may include the at least one computer readable medium of any of Examples 18 to 20, comprising a further set of instructions, which when executed by a computing device, cause the computing device to integrate habit-related information as part of the contextual information for the user.

Example 22 may include the at least one computer readable medium of any of Examples 18 to 21, comprising a further set of instructions, which when executed by a computing device, cause the computing device to monitor the user response to the recommended break-related action.

Example 23 may include the at least one computer readable medium of Example 22, comprising a further set of instructions, which when executed by a computing device, cause the computing device to adjust a subsequent recommended break-related action based on the user response to the recommended break-related action.

Example 24 may include the at least one computer readable medium of any of Examples 18 to 23, comprising a further set of instructions, which when executed by a computing device, cause the computing device to monitor the user for a break-related action.

Example 25 may include a break management apparatus, comprising means for integrating manual-input-related information for a user, means for classifying an action of the user, means for timing a period of time since a prior action of the user was classified as a break-related action, means for providing timer-based information, means for integrating contextual information for the user in addition to the manual-input-related information and the timer-related information, and means for recommending that the user take a recommended break-related action based on the period of time since the prior break-related action of the user and also based on the contextual information for the user.

Example 26 may include the break management apparatus of Example 25, further comprising means for integrating schedule-related information as part of the contextual information for the user.

Example 27 may include the break management apparatus of any of Examples 25 to 26, further comprising means for integrating location-related information as part of the contextual information for the user.

Example 28 may include the break management apparatus of any of Examples 25 to 27, further comprising means for integrating habit-related information as part of the contextual information for the user.

Example 29 may include the break management apparatus of any of Examples 25 to 28, further comprising means for monitoring the user response to the recommended break-related action.

Example 30 may include the break management apparatus of Example 29, further comprising means for adjusting a subsequent recommended break-related action based on the user response to the recommended break-related action.

Example 31 may include the break management apparatus of any of Examples 25 to 30, further comprising means for monitoring the user for a break-related action.

Example 32 may include the break management apparatus of any of Examples 25 to 30, wherein the contextual information includes contextual information related to at least one other user.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A break management system, comprising:
   a computing device;
   an input device communicatively coupled to the computing device; and
   an output device communicatively coupled to the computing device, the computing device further including:
   a manual-input integrator, implemented at least partly in one or more of configurable logic or fixed-functionality logic hardware, communicatively coupled to the input device to integrate manual-input-related information for a user;
   an action classifier communicatively coupled to the manual-input integrator to classify an action of the user;
   a break timer communicatively coupled to the action classifier to time a period of time since the action classifier classified a prior action of the user as a break-related action and to provide timer-related information;
   a contextual integrator, implemented at least partly in one or more of configurable logic or fixed-functionality logic hardware, to integrate contextual information for the user in addition to the manual-input-related information and the timer-related information, wherein the contextual integrator includes:
   a schedule integrator, implemented at least partly in one or more of configurable logic or fixed-functionality logic hardware, to integrate schedule-related information for the user as part of the contextual information, wherein the schedule-related information is to include a scheduled event,
   a location integrator, implemented at least partly in one or more of configurable logic or fixed-functionality logic hardware, to integrate location-related information for the user as part of the contextual information, wherein the location-related information is to include a distance between a location of the scheduled event and a location of the user, and
   a habit integrator, implemented at least partly in one or more of configurable logic or fixed-functionality logic hardware, to integrate habit-related information for the user, wherein the habit-related information is to identify a number of physical steps that that the user previously took to travel between the location of the scheduled event and the location of the user; and
   a break recommender communicatively coupled to the break timer and the contextual integrator to recommend that the user take a recommended break-related action based on the period of time since the action classifier classified the prior action of the user as the break-related action and also based at least on the distance and the schedule-related information of the contextual information, wherein the break recommender is further to recommend the break-related action based on the number of physical steps, wherein the location of the user is to include a predicted location of the user or a current location of the user.

2. The break management system of claim 1, wherein:
   the habit-related information is to identify a pattern associated with previously scheduled events, wherein the pattern is that the user selects a first action from a plurality of actions associated with the previously scheduled events,
   the break recommender is further to recommend that the user take the recommended break-related action based also on the habit-related information so that the recommended break-related action is a second action from the plurality of actions.

3. The break management system of claim 1, wherein the computing device further comprises:
   a response monitor to monitor a user response to the recommended break-related action; and
   a recommendation adjuster communicatively coupled to the response monitor and the break recommender to adjust a subsequent recommended break-related action based also on the user response to the recommended break-related action.

4. A break management apparatus, comprising:
   a manual-input integrator, implemented at least partly in one or more of configurable logic or fixed-functionality logic hardware, to integrate manual-input-related information for a user;

a break timer communicatively coupled to the manual-input integrator to time a period of time since a prior break-related action of the user as a break-related action and to provide timer-related information;
a contextual integrator, implemented at least partly in one or more of configurable logic or fixed-functionality logic hardware, to integrate contextual information for the user in addition to the manual-input-related information and the timer-related information, wherein the contextual integrator includes:
 a schedule integrator, implemented at least partly in one or more of configurable logic or fixed-functionality logic hardware, to integrate schedule-related information for the user as part of the contextual information, wherein the schedule-related information is to include a scheduled event,
 a location integrator, implemented at least partly in one or more of configurable logic or fixed-functionality logic hardware, to integrate location-related information for the user as part of the contextual information, wherein the location-related information is to include a distance between a location of the scheduled event and a location of the user, and
 a habit integrator, implemented at least partly in one or more of configurable logic or fixed-functionality logic hardware, to integrate habit-related information for the user, wherein the habit-related information is to identify a number of physical steps that that the user previously took to travel between the location of the scheduled event and the location of the user; and
a break recommender communicatively coupled to the break timer and the contextual integrator to recommend that the user take a recommended break-related action based on the period of time since the prior break-related action of the user and also based at least on the distance and the schedule-related information of the contextual information for the user, wherein the break recommender is further to recommend the break-related action based on the number of physical steps, wherein the location of the user is to include a predicted location of the user or a current location of the user.

5. The break management apparatus of claim 4, wherein:
the habit-related information is to identify a pattern associated with previously scheduled events, wherein the pattern is that the user selects a first action from a plurality of actions associated with the previously scheduled events,
the break recommender is further to recommend that the user take the recommended break-related action based also on the habit-related information so that the recommended break-related action is a second action from the plurality of actions.

6. The break management apparatus of claim 4, further comprising:
a response monitor to monitor a user response to the recommended break-related action; and
a recommendation adjuster communicatively coupled to the response monitor and the break recommender to adjust a subsequent recommended break-related action based on the user response to the recommended break-related action.

7. The break management apparatus of claim 4, wherein the contextual information includes contextual information related to at least one other user.

8. A method of managing a break, comprising:
integrating manual-input-related information for a user;
classifying an action of the user;
timing a period of time since a prior action of the user was classified as a break-related action;
providing timer-related information;
integrating contextual information for the user in addition to the manual-input-related information and the timer-related information;
integrating schedule-related information for the user as part of the contextual information, wherein the schedule-related information is to include a scheduled event;
integrating location-related information for the user as part of the contextual information, wherein the location-related information is to include a distance between a location of the scheduled event and a location of the user;
recommending that the user take a recommended break-related action based on the period of time and also based at least on the distance and the schedule-related information of the contextual information for the user;
integrating habit-related information for the user, wherein the habit-related information is to identify a number of physical steps that that the user previously took to travel between the location of the scheduled event and the location of the user, wherein the location of the user is to include a predicted location of the user or a current location of the user; and
recommending the break-related action based on the number of physical steps.

9. The method of managing a break of claim 8, wherein:
the habit-related information is to identify a pattern associated with previously scheduled events, wherein the pattern is that the user selects a first action from a plurality of actions associated with the previously scheduled events; and
the method further comprises recommending that the user take the recommended break-related action based also on the habit-related information so that the recommended break-related action is a second action from the plurality of actions.

10. The method of managing a break of claim 8, further comprising:
monitoring a user response to the recommended break-related action.

11. The method of managing a break of claim 10, further comprising:
adjusting a subsequent recommended break-related action based on the user response to the recommended break-related action.

12. The method of managing a break of claim 8, further comprising:
monitoring the user for a break-related action.

13. At least one computer readable medium, comprising a set of instructions, which when executed by a computing device, cause the computing device to:
integrate manual-input-related information for a user;
classify an action of the user;
time a period of time since a prior action of the user was classified as a break-related action;
provide timer-related information;
integrate contextual information for the user in addition to the manual-input-related information and the timer-related information;
integrate schedule-related information for the user as part of the contextual information, wherein the schedule-related information is to include a scheduled event;

integrate location-related information for the user as part of the contextual information, wherein the location-related information is to include a distance between a location of the scheduled event and a location of the user;

recommend that the user take a recommended break-related action based on the period of time and also based at least on the distance and the schedule-related information of the contextual information for the user;

integrate habit-related information for the user, wherein the habit-related information is to identify a number of physical steps that that the user previously took to travel between the location of the scheduled event and the location of the user, wherein the location of the user is to include a predicted location of the user or a current location of the user; and recommend the break-related action based on the number of physical steps.

14. The at least one computer readable medium of claim 13, wherein:

the habit-related information is to identify a pattern associated with previously scheduled events, wherein the pattern is that the user selects a first action from a plurality of actions associated with the previously scheduled events; and the at least one computer readable medium comprises a further set of instructions, which when executed by a computing device, cause the computing device to recommend that the user take the recommended break-related action based also on the habit-related information so that the recommended break-related action is a second action from the plurality of actions.

15. The at least one computer readable medium of claim 13, comprising a further set of instructions, which when executed by a computing device, cause the computing device to:

monitor a user response to the recommended break-related action.

16. The at least one computer readable medium of claim 15, comprising a further set of instructions, which when executed by a computing device, cause the computing device to:

adjust a subsequent recommended break-related action based on the user response to the recommended break-related action.

17. The at least one computer readable medium of claim 13, comprising a further set of instructions, which when executed by a computing device, cause the computing device to:

monitor the user for a break-related action.

18. The break management system of claim 1, wherein the habit-related information is to identify a habit-related time that the user has executed an action-related habit, wherein the break recommender is further to:

adjust or restart the break timer based on the habit-related time so that the break timer is to expire after the habit-related time;

in response to an expiration of the break timer after the habit-related time, conduct an identification that the user has not executed the action-related habit; and in response to the identification that the user has not executed the action-related habit, recommend the recommended break-related action.

19. The break management apparatus of claim 4, wherein the habit-related information is to identify a habit-related time that the user has executed an action-related habit, wherein the break recommender is further to:

adjust or restart the break timer based on the habit-related time so that the break timer is to expire after the habit-related time;

in response to an expiration of the break timer after the habit-related time, conduct an identification that the user has not executed the action-related habit; and in response to the identification that the user has not executed the action-related habit, recommend the recommended break-related action.

20. The method of managing a break of claim 8, wherein the habit-related information is to identify a habit-related time that the user has executed an action-related habit;

wherein the method further comprises:

adjusting or restarting a break timer based on the habit-related time so that the break timer is to expire after the habit-related time;

in response to an expiration of the break timer after the habit-related time, conducting an identification that the user has not executed the action-related habit; and in response to the identification that the user has not executed the action-related habit, recommending the recommended break-related action.

21. The at least one computer readable medium of claim 13, wherein the habit-related information is to identify a habit-related time that the user has executed an action-related habit;

wherein the at least one computer readable medium comprises a further set of instructions, which when executed by a computing device, cause the computing device to:

adjust or restart a break timer based on the habit-related time so that the break timer is to expire after the habit-related time;

in response to an expiration of the break timer after the habit-related time, conduct an identification that the user has not executed the action-related habit; and in response to the identification that the user has not executed the action-related habit, recommend the recommended break-related action.

* * * * *